United States Patent [19]

Wessel et al.

[11] Patent Number: 4,638,149

[45] Date of Patent: Jan. 20, 1987

[54] POWER-PROCESSING UNIT

[75] Inventors: Frank J. Wessel, Santa Monica; Donald J. Hancock, Thousand Oaks, both of Calif.

[73] Assignee: Hughes Aircraft Company, Los Angeles, Calif.

[21] Appl. No.: 507,659

[22] Filed: Jun. 27, 1983

[51] Int. Cl.[4] .......................... H05B 1/02; H02P 13/24

[52] U.S. Cl. .................................... 219/499; 219/483; 219/508; 313/359.1; 313/363.1; 323/251; 323/361

[58] Field of Search ............... 219/499, 501, 483, 486, 219/121 P, 121 PY, 121 EB, 494, 497, 508–510; 323/247, 250, 251, 290, 358, 361; 313/359.1, 363.1

[56] References Cited

U.S. PATENT DOCUMENTS

| | | | |
|---|---|---|---|
| 3,096,456 | 7/1963 | Shelton et al. | 313/359.1 |
| 3,210,926 | 10/1965 | Forbes et al. | 313/359.1 |
| 3,390,303 | 6/1968 | Abramyan et al. | 313/359.1 |
| 3,878,358 | 4/1975 | Barton et al. | 219/497 |
| 3,889,173 | 6/1975 | Klusmann et al. | 323/290 |
| 3,913,320 | 10/1975 | Reader | 313/363.1 |
| 4,054,810 | 10/1977 | Beckey | 313/359.1 |
| 4,276,587 | 6/1981 | Koizumi | 323/247 |
| 4,323,962 | 4/1982 | Steigerwald | 323/290 |
| 4,343,034 | 8/1982 | Wells et al. | 323/251 |
| 4,481,062 | 11/1981 | Kaufmann et al. | 313/359.1 |

FOREIGN PATENT DOCUMENTS

| | | |
|---|---|---|
| 1361653 | 6/1963 | France . |
| 473368 | 4/1936 | United Kingdom . |

OTHER PUBLICATIONS

Journal of Spacecraft and Rockets, vol. 11, No. 11, Nov. 1974 (New York, US) A. Costes et al.: "Power Conditioning and Control Unit for the French Cesium Contact Ion Thruster".

Journal of Spacecraft and Rockets, vol. 7, No. 7, Jul. 1970 (New York, US), P. A. Mueller et al.: "Control Analysis of an Ion Thruster with Programmed Thrust".

IBM Technical Disclosure Bulletin, vol. 21, No. 6, Nov. 1978 (New York, US) L. M. Ernst et al.: "Fuser Temperature Control Circuit".

Elektronik, No. 4, Apr. 1969, (Munich, DE) A. Evangelisti: "Eine Zeitproportionale Temperaturregelung".

Elektronik, vol. 31, No. 14, Jul. 1982, (Munich, DE) D. W. Gyma: "Programmierbare Netzteile fur Viele Anwendungen".

Electronic Design, vol. 26, No. 19, Sep. 13, 1978 (Rochelle Park, US) H. Wurzburg: "Regulator Performs Symmetry Correction in a Push–Pull Switching Power Supply".

*Primary Examiner*—M. H. Paschall
*Attorney, Agent, or Firm*—A. W. Karambelas

[57] ABSTRACT

Power-processing unit uses AC buses (30, 32) to supply all current dependent needs such as connections (54, 56) to an ion thruster through an inductor (88) and the primary of a transformer (90), to assure limited currents to such loads. Where temperature control is also required, such as to the main discharge vaporizer heater connection (36, 38), switches (100, 102) are serially connected with inductor (96) and the primary of transformer (98). Temperature sensor (104) controls the switches (100, 102) for temperature regulation.

11 Claims, 11 Drawing Figures

10
14
16
18
22
PULSE WIDTH MOD
24
26
28
30
32
88
90
(FIG. 3)
54
56
48
50
118
120
LOGIC MOD
42
44
(FIG. 2)
(FIG. 4)
106
104
122
108
98
96
100
102
(FIG. 5)
36
38
(FIG. 11)
126
138
140
60
66
62
(FIG. 6)
84
86
(FIG. 8)
(FIG. 7)
78
80
(FIG. 9)
72
74
(FIG. 10)

POWER-PROCESSING UNIT

The invention described herein was made in the performance of work under NASA Contract No. NAS3-22447 and is subject to the provisions of Section 305 of the National Aeronautics and Space Act of 1958, 42 USC 2457.

BACKGROUND OF THE INVENTION

This invention is directed to a power-processing unit for receiving unregulated power and supplying power to various needs, particularly for an ion thruster.

Ion thrusters have a plurality of different electrical needs. Since ion thrusters are used in spacecraft, it is desirable to minimize the weight of the power unit which supplies these needs and at the same time maintain adequate reliability for maximizing the spacecraft reliability. Previous power-processing units were principally digital in the nature of the control thereof, and the management of the power-processing unit and the thruster connected thereto was in software. This resulted in a complex, weighty, and physically large power-processing unit system. The prior power-processing unit had approximately ten times more parts and, accordingly, weighed more and cost more. Thus, there was need for an improved power-processing unit which was lighter, smaller and more reliable.

SUMMARY OF THE INVENTION

In order to aid in the understanding of this invention it can be stated in essentially summary form that it is directed to a power-processing unit particularly for supplying electric power to an ion thruster, wherein the current responsive requirements of the thruster are controlled by inductive current regulators in AC supply legs.

It is thus a purpose and advantage of this invention to provide a power-processing unit which is comparatively small in size, weight and parts count, while high in reliability so that the power-processing unit can be employed to supply the requirements of an ion thruster in a spacecraft.

It is a further purpose and advantage of this invention to provide a power-processing unit for supplying the power needs of an ion thruster wherein the current regulated requirements are controlled by an inductor in an AC leg, and wherein the high voltage requirements of the screen and accelerator electrodes are supplied from the same transformer, with voltage and current sensing on the primary of the transformer.

Other purposes and advantages of this invention will become apparent from a study of the following portion of the specification, the claims and the attached drawings.

DETAILED DESCRIPTION OF THE INVENTION

Figure 1:
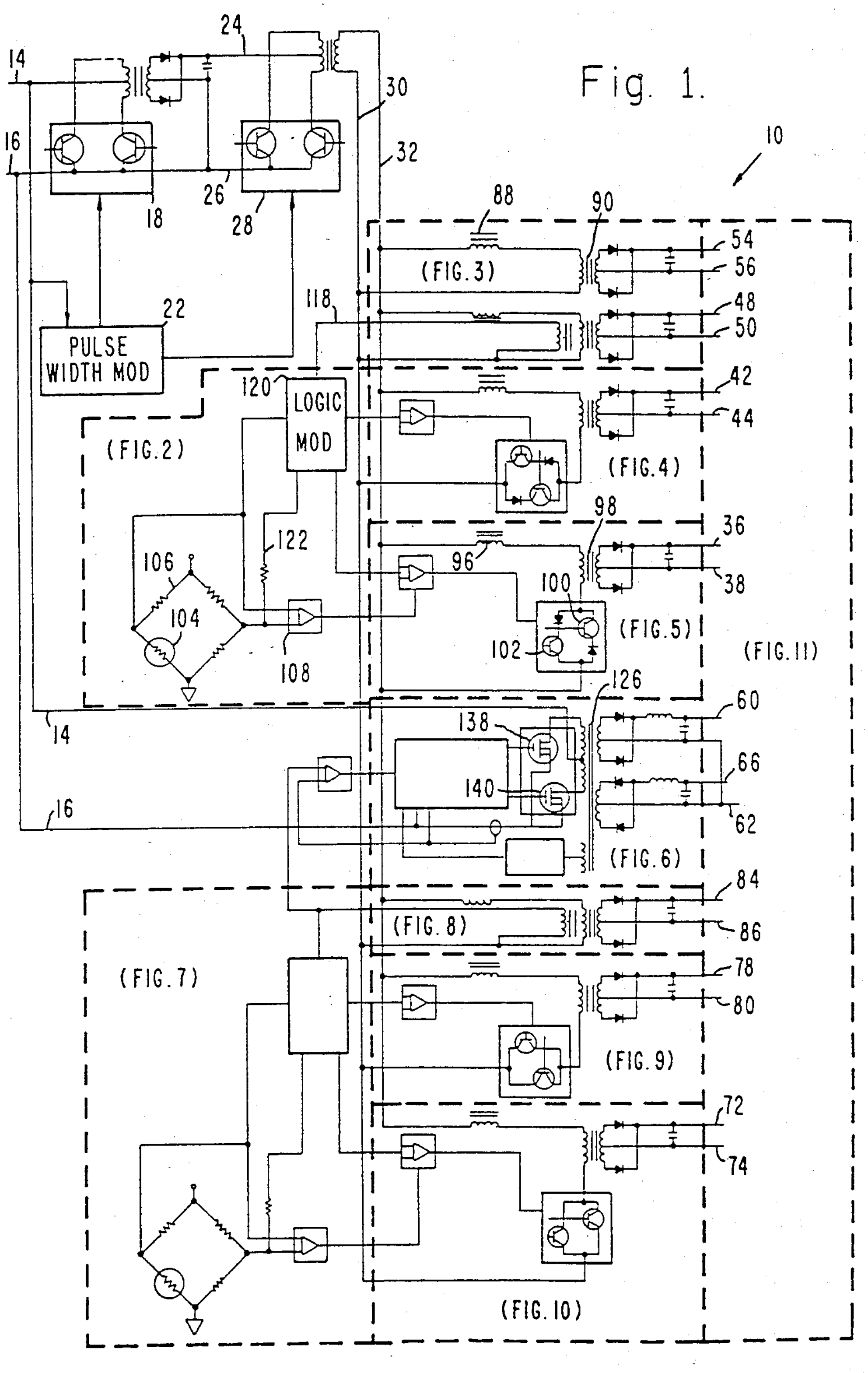
FIG. 1 is an electrical block diagram of the power-processing unit of this invention.
Figure 11:
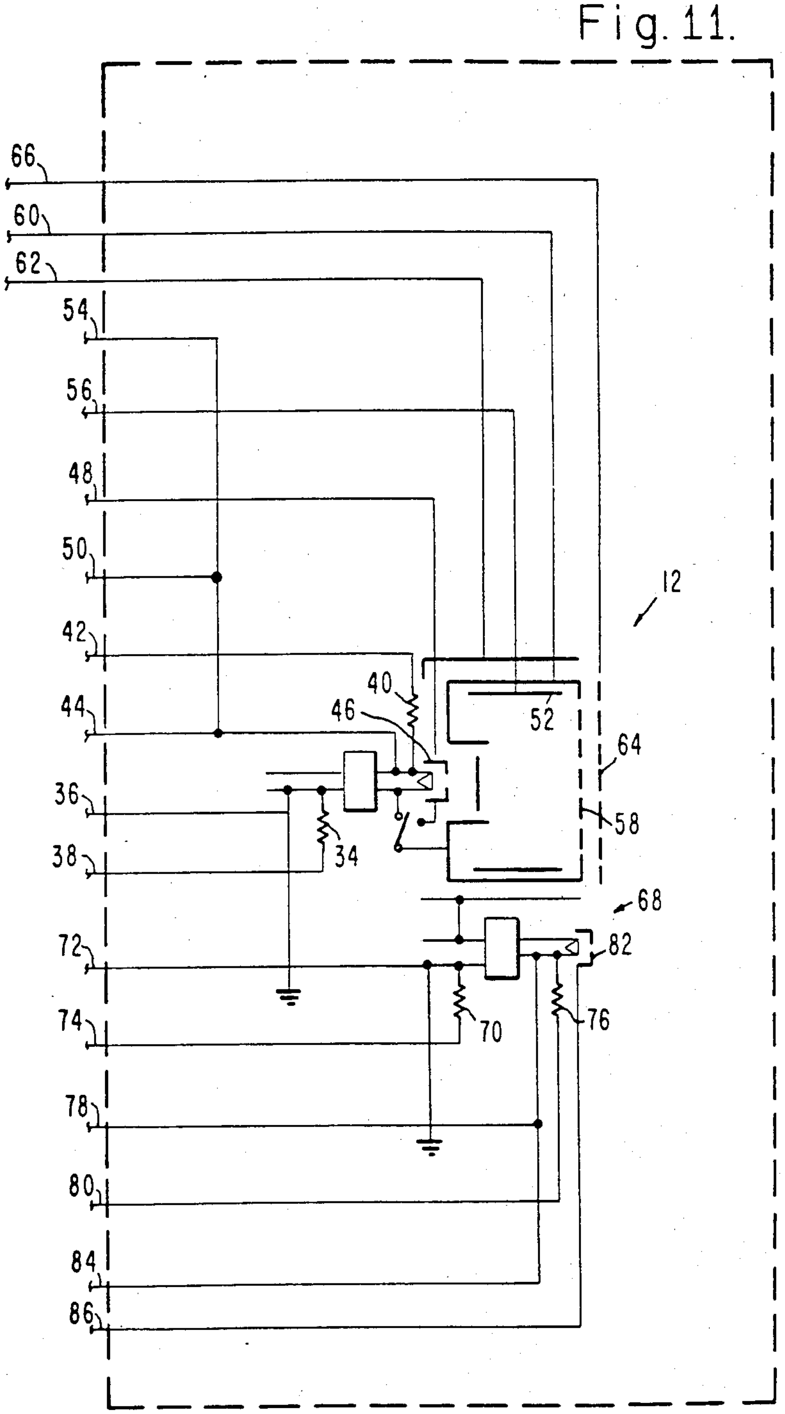
FIG. 11 is a schematic showing the connections to the ion thruster.

The power-processing unit 10 of this invention is generally indicated at 10 in FIG. 1. FIG. 1 is divided into several subsections which are shown in more detail in other figures of the drawing. FIG. 11 shows the ion thruster 12 which is the preferred load for the power-processing unit 10. Similar considerations may be employed for other loads but the power-processing unit 10 is described in connection with this particular load. Thus, the power-processing unit 10 is employed on a spacecraft and the input power for the power-processing unit comes from onboard-power sources, such as batteries and/or solar-cell arrays. In the present instance, buses 14 and 16 are primary buses which are supplied from solar-cell arrays. DC to DC regulator 18 is controlled by pulse-width modulator 22. The output from the pulse width modulated converter 18 provides regulated DC power in buses 24 and 26. These buses are connected to a DC to AC inverter 28 controlled by an oscillator in pulse width oscillator. Inverter 28 has its output in regulated AC buses 30 and 32.

The ion thruster 12 in FIG. 11, is a Kaufman thruster and has several power needs. The incoming liquid metal fuel such as cesium or mercury which is used as the propellant, must be vaporized at the porous plug in the liquid metal fuel in the thruster feed line. The vaporizer plug is heated by heater 34, which is supplied by supply lines 36 and 38. When a gaseous fuel such as xenon is employed, the vaporizer and heater are not necessary. Similarly, cathode heater 40 is supplied by cathode heater supply lines 42 and 44. Main keeper 46 is supplied by main keeper supply lines 48 and 50. Anode 52 is supplied by anode supply lines 54 and 56. Screen electrode 58 is fed by screen supply lines 60 and 62 while the accelerator electrode 64 is fed by accelerator electrode supply lines 66 and 62. These are the required portions of the ion thruster system which require corresponding power supplies for the operation of the ion thruster.

In order to prevent charging of the spacecraft, neutralizer 68 is associated with the thruster to provide electrons which neutralize the charge of the ions expelled from the thruster to create thrust. Neutralizer 68 is illustrated in FIG. 11. Neutralizer 68 has some similar requirements to the ion thruster. The supply of mercury or other fuel to the neutralizer requires vaporization. Neutralizer vaporizer heater 70 performs this function and is supplied by neutralizer supply lines 72 and 74. The neutralizer cathode is heated by neutralizer cathode heater 76 which is powered by neutralizer cathode heater supply lines 78 and 80. In addition, neutralizer keeper 82 is supplied by neutralizer keeper supply lines 84 and 86.

Figures 3, 4, 5:
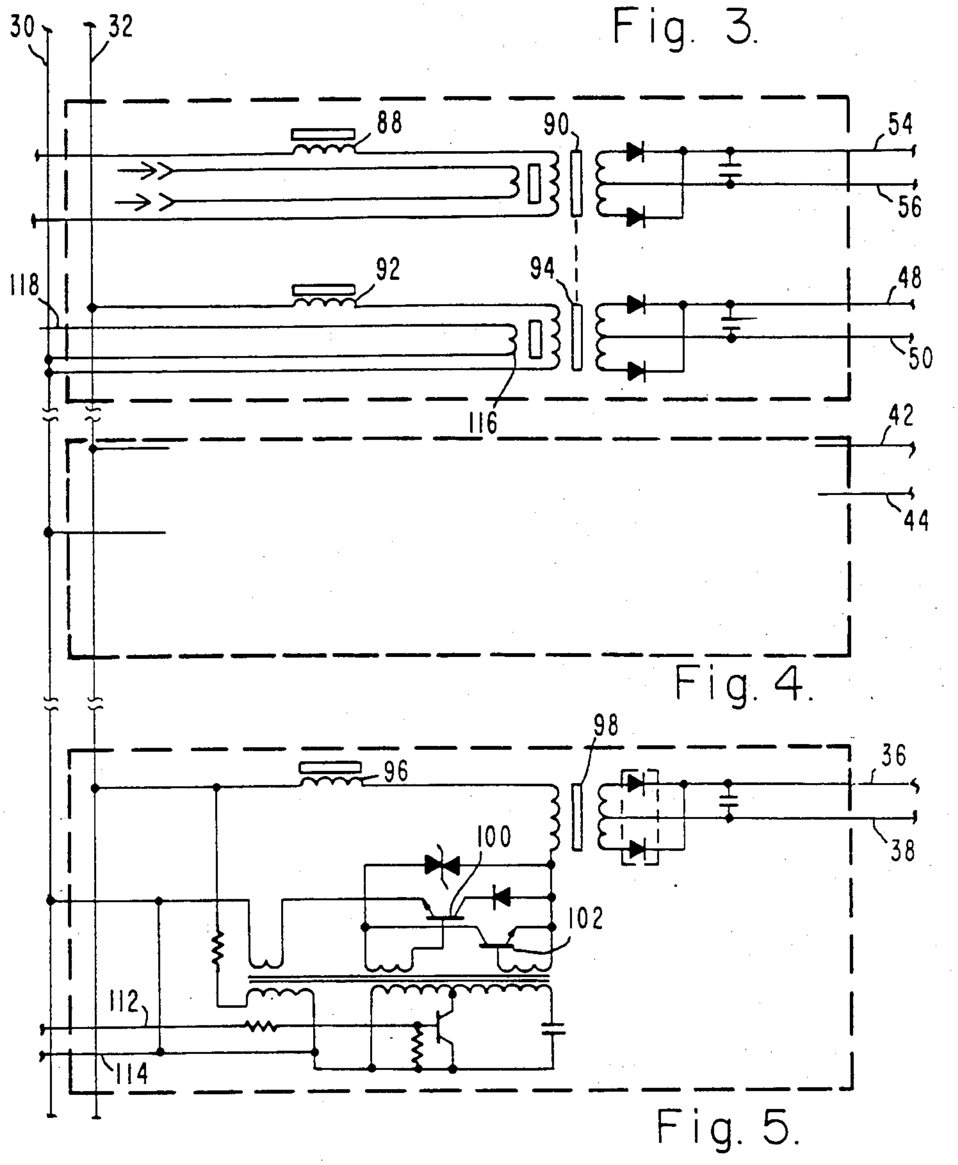
FIG. 3 is a more detailed schematic of the current supply to the main discharge and main discharge keeper, as seen in the corresponding portion of FIG. 1.
FIG. 4 is the same as FIG. 5, and they respectively show more detailed circuitry of the main discharge cathode heater and the main discharge vaporizer heater power supplies.
Figure 6:
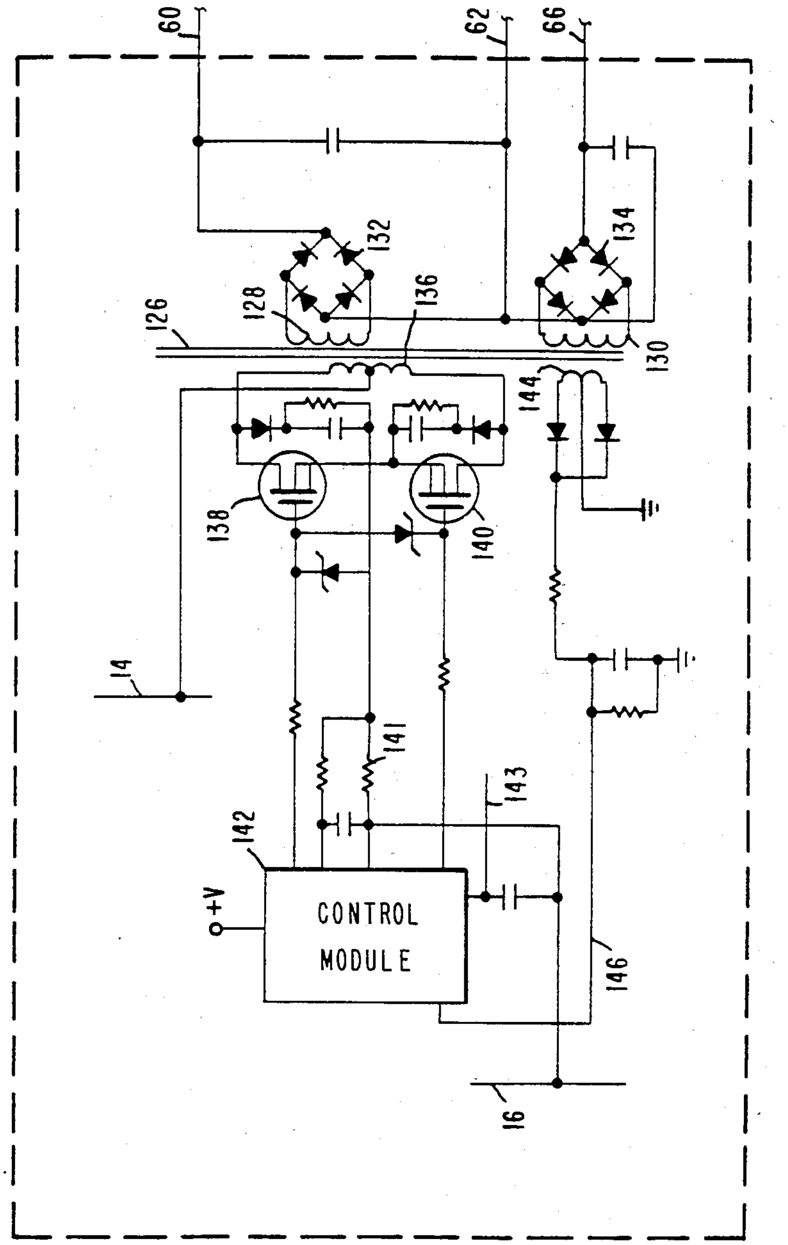
FIG. 6 is a more detailed electrical schematic showing the voltage supply to the screen and accelerator electrodes, corresponding to the similar portion of FIG. 1.

There is a great deal of similarity in the functional requirements of the various loads. Each of the described loads, except the screen electrode and the accelerator electrode supplied by the power supply of FIG. 6, is a current regulated supply. The requirement in each of those cases is for energy control to the heater. The buses 30 and 32 are regulated AC buses which, in FIG. 3, are serially connected through current limiting inductor 88 and the primary of transformer 90. The output of the secondary of that transformer is rectified to supply the thruster discharge current in lines 54 and 56. Inductor 88 is chosen so that its impedance is large compared to the load impedance. Therefore, the load impedance can vary over a wide range without significantly changing the circuit current. The load can vary from a short to several times nominal without significant effect on the load current. In the lower half of FIG. 3, impedance 92 is serially connected with the primary of transformer 94 and the output of the secondary of that transformer is rectified to supply lines 48 and 50 with current for the discharge keeper.

Figure 2:
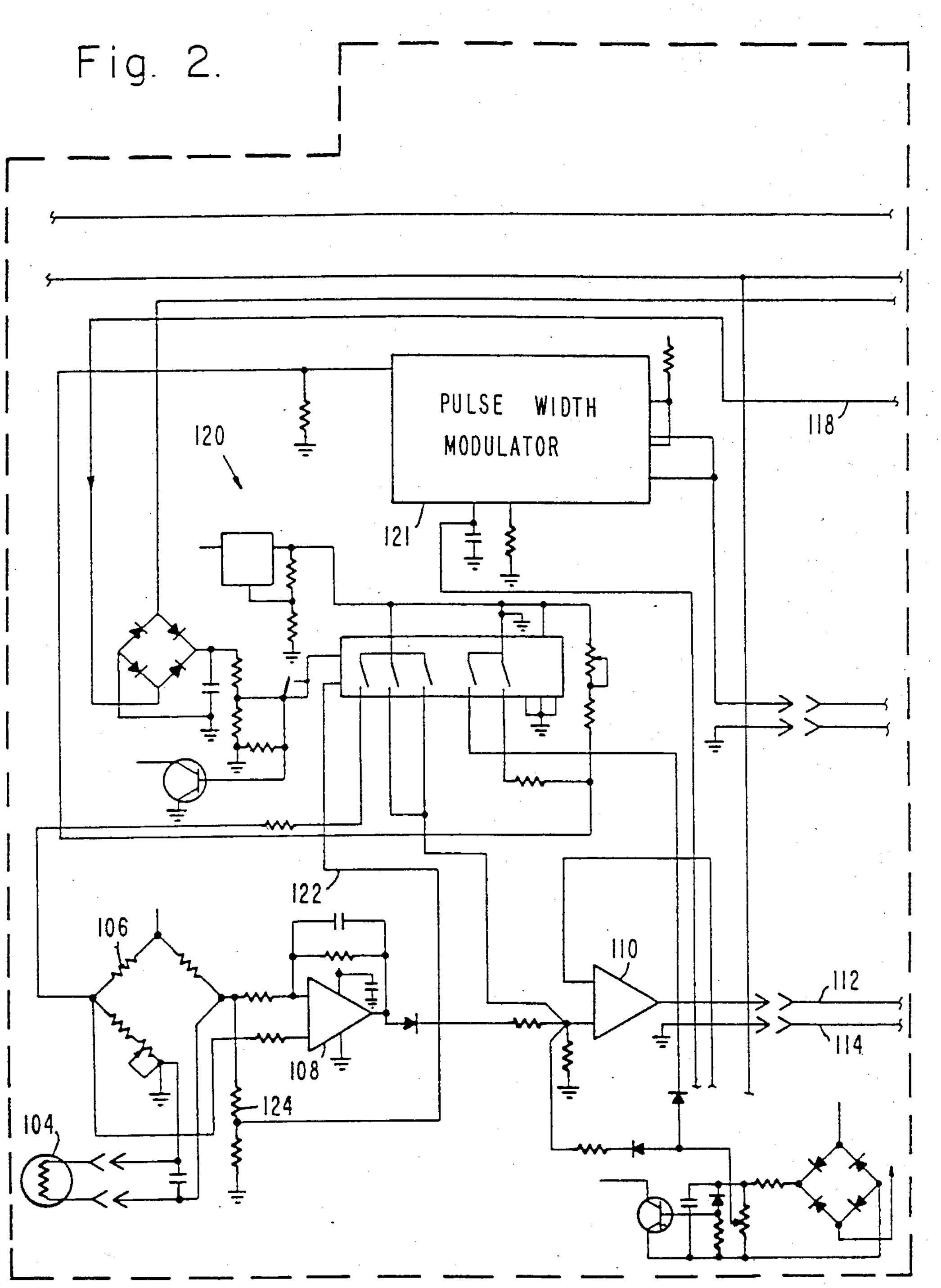
FIG. 2 is a more detailed electrical schematic of the control logic and the discharge of vaporizer temperature control portion of the circuit of FIG. 1.

The supply of power to the discharge cathode heater 40 and the supply of power to the discharge vaporizer heater 34 are the same and the latter is illustrated in FIG. 5. As is seen in FIG. 1, circuitry identical to the FIG. 5 circuitry is employed to power the discharge cathode heater 40. Therefore, only the power supply of FIG. 5 to the discharge vaporizer heater 34 need be discussed in detail. Similarly to FIG. 3, the AC regulated buses 30 and 32 are serially connected through an inductor 96 and a primary of transformer 98. The output of the secondary of transformer 98 is rectified to provide power to the discharge vaporizer heater supply lines 36 and 38. In addition, chopping transistors 100 and 102 are serially connected with the primary transformer coil to on and off switch the primary current. The transistor switches are controlled by the control system illustrated in FIG. 2, by the signals in lines 112 and 114.

In the preferred embodiment of thruster for which the power-processing unit of this invention is provided, mercury is supplied as the mass to be ionized and expelled. Mercury can be conveniently stored in liquid form but it needs to vaporize before ionization. The vaporizer is a heated porous plug with the liquid mercury in contact with the input end thereof and with the heater 34 in thermal contact with the plug so as to heat the plug. The rate of mercury boil-off is a direct function of plug temperature. The mercury vapor resulting from the boil-off passes through the plug and is the vaporized mercury supplied to the thruster. Thus, temperature control of the plug controls the rate of vaporized mercury fuel flow to the thruster. Temperature sensor 104 is directly associated with the plug to sense the temperature thereof. Since the temperatures are high, a resistive temperature sensor is employed and is connected into bridge 106 which has its output connected through temperature error amplifier 108 and duty cycle controller 110 to provide output control signals in lines 112 and 114, see FIGS. 2 and 5, which in turn control the power switches for the heater.

There are three modes of operation of the vaporizer. For starting duty cycle, full power is applied to the heater to reach the higher temperature required to supply fuel for starting purposes. When starting temperature is reached, the power supply reduces power to the vaporizer by reducing the on-to-off duty cycle ratio to about 85% on-time. The temperature sensor 104 and bridge 106 are set to maintain the temperature for normal operation. After ignition, the normal running duty cycle set point is about 60% on-time and is a function of sensed temperature. Secondary 116 of transformer 94, see FIG. 3, senses the voltage to the discharge keeper and emits a signal on line 118. That signal goes to logic module 120 (which includes pulse width modulator 121) which is connected by line 122 to resistor 124. The resistor has a potential on it which offsets the bridge 106 to offset the sensed temperature. In this way, the temperature controller can operate at either duty cycle. When the current to the main discharge keeper 46 indicates ignition, the set point is changed so that the fuel supply is delivered at the run duty cycle.

A relatively high potential must be applied to screen electrode 58 and a different relatively high potential applied to the accelerator electrode 64. FIG. 1 shows the general arrangement of the circuitry and FIG. 6 shows the circuitry in detail. Unregulated DC bus 14 is connected to the center tap of the high voltage transformer 126. Secondaries 128 and 130 are respectively connected through rectifier bridges 132 and 134 to supply lines 60, 62 and 66 to supply the screen and accelerator electrode potential requirements. With both of these secondaries connected to the same transformer in the appropriate turns ratio, the primary 136 of the transformer can be controlled by a single controller to provide the desired screen and accelerator electrode potentials. Transistor switches 138 and 140 are choppers which are controlled by control module 142 to provide the desired output potential. Sensor coil 144 is connected to respond to the magnetic flux in the high voltage transformer 126 to thus have an output signal which corresponds to the secondary potential. The voltage sensing signal from coil 144 is rectified and is sent back to control module 142 through line 146. In this way, a constant potential is maintained on the screen and accelerator electrodes.

Current sensing is provided to control module 142 by sensing resistor 141 to shut down the switches 138 and 140 in the event of a down-circuit fault. Input line 143 provides a signal that the discharge keepers are operating which indicates the high voltage supplies to the screen and accelerator electrodes can be actuated.

Figures 8, 9, 10:
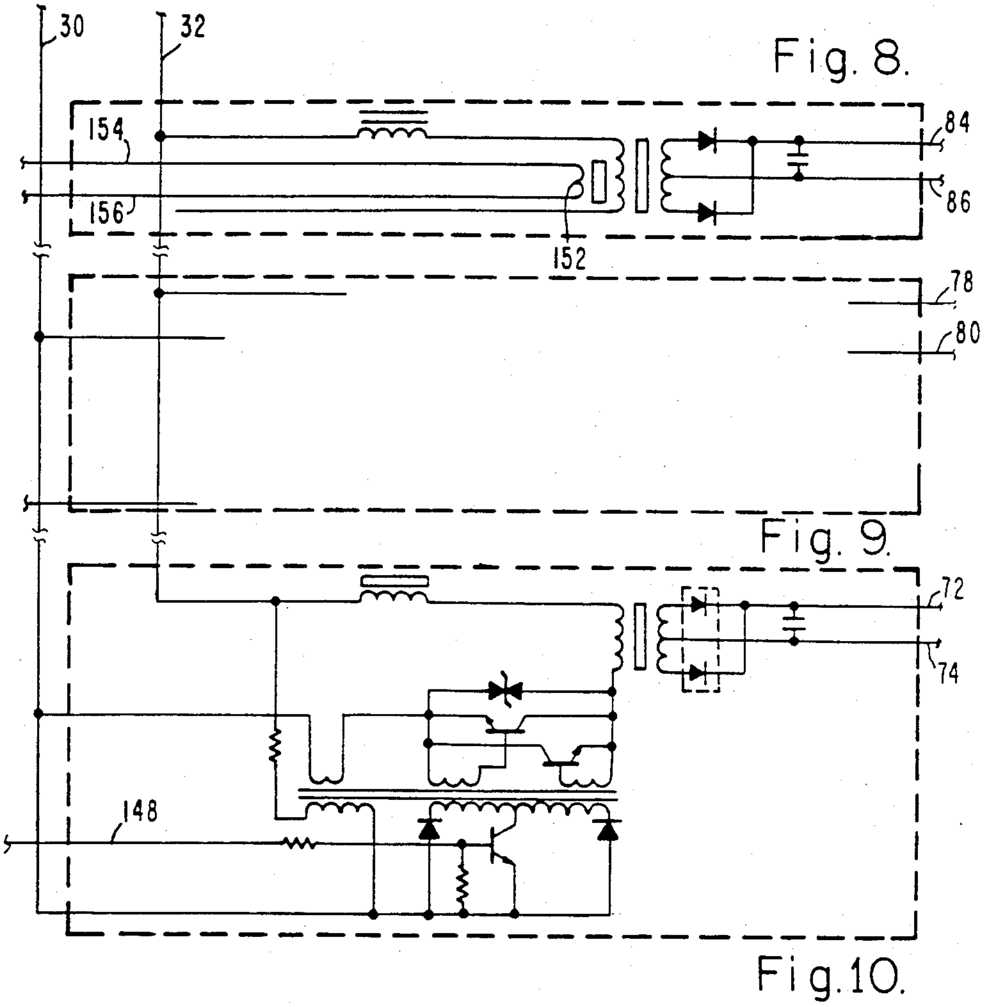
FIG. 8 is a more detailed schematic of the similar portion of FIG. 1, showing the current supply to the neutralizer keeper.
FIG. 9 is the same as FIG. 10 and they respectively show the power supply for the neutralizer cathode heater and the neutralizer vaporizer heater in more detail in the corresponding portions of FIG.1.

The requirements of the neutralizer keeper 82 are the same as the requirements of the main discharge keeper 46. Therefore, the power supply in FIG. 8 is the same as the power supply in the lower half of FIG. 3. Of course, the components are of selected value to control the current at an appropriate level. Similarly, the requirements of the neutralizer cathode heater 76 are the same as the requirements of the main discharge cathode heater 40. Therefore, the neutralizer cathode heater power supply of FIG. 9 is the same as the one in FIG. 4, which in turn was described with respect to FIG. 5. Additionally, the neutralizer vapor heater power supply of FIG. 10 is the same as that described with respect to FIG. 5, but with appropriate current and temperature criteria for that requirement.

Figure 7:
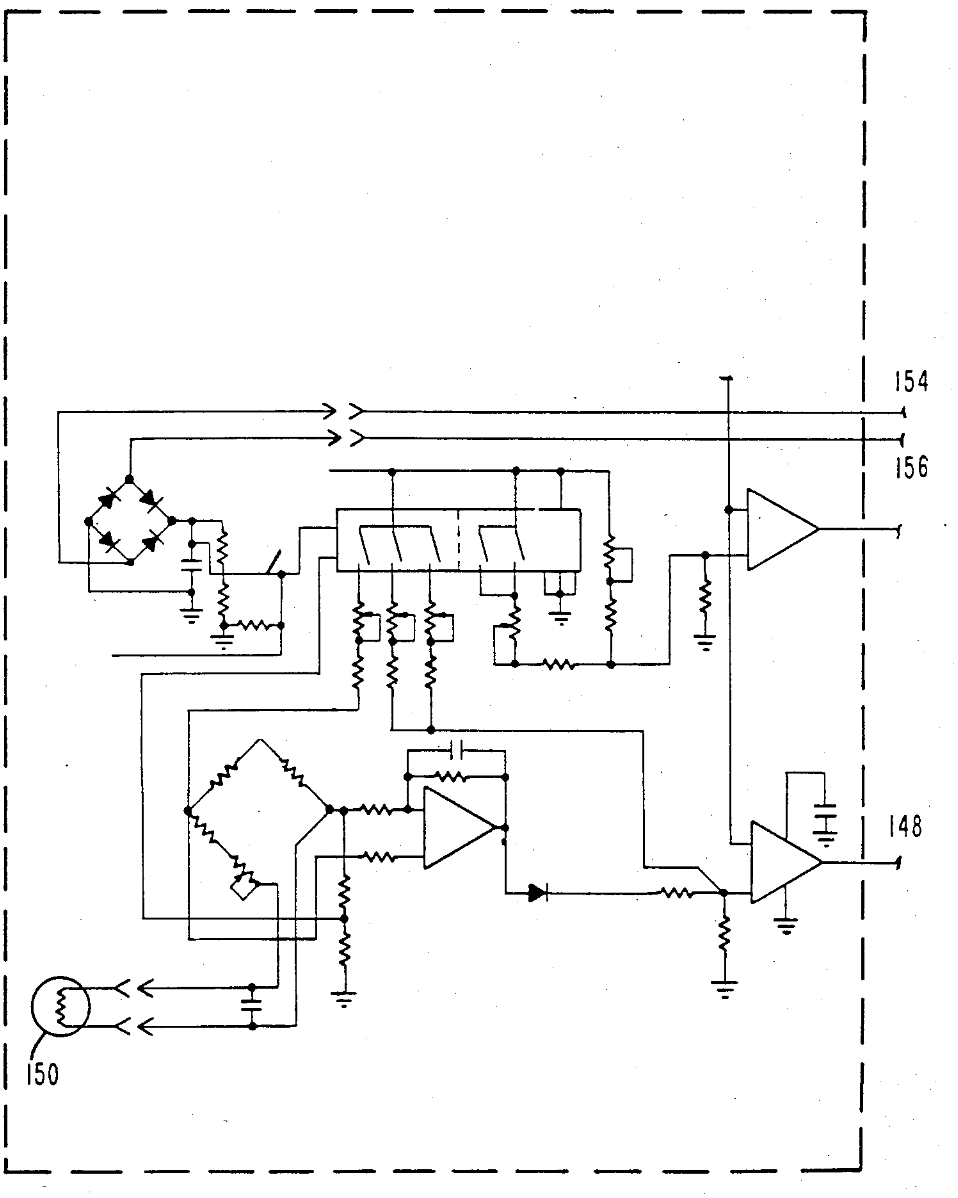
FIG. 7 is similar to FIG. 2, showing the neutralizer vaporizer temperature control.

The control for the temperature regulation in FIG. 10 is accomplished by the circuitry of FIG. 7 and has output line 148 which controls the chopping transistors in FIG. 10. The temperature sensor 150 is positioned at the vaporizer and the set point of its bridge is controlled by the sensor coil 152, see FIG. 8, which has its output in lines 154 and 156. In this way, the set point of the temperature controller of the neutralizer vaporizer heater is managed both in accordance with temperature and in acccordance with start mode or run mode considerations.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A power-processing unit comprising:

a pair of alternating current buses for connection to supply alternating current power;

a plurality of power supply circuits each consisting of a serially connected inductor and a transformer primary connected between said buses, said circuits each also comprising a transformer secondary magnetically coupled to each said transformer primary, a rectifier connected to each said transformer secondary so that each of said secondaries can be connected to a load in an ion thruster for supplying a current limited direct current thereto;

at least one serially connected second inductor, second transformer primary and switch connected between said buses, a second transformer secondary magnetically coupled to said second transformer primary and second rectifiers connected to said second transfomer secondary to supply a current limited load, a temperature sensor connected to said switch to control said switch in accordance with sensed temperature of the load so that the load connectable to said second transformer secondary is current limited and powered in accordance with sensed temperature;

a pair of unregulated DC buses for connection to a substantially unregulated DC source and connected thereto is a DC to DC regulator for providing current at a substantially constant voltage and connected thereto is a DC to AC inverter for supplying alternating current at a substantially fixed frequency and voltage, said alternating current buses being supplied by said DC to AC inverter; and including a high voltage power supply having separate transformer secondaries for connection to a screen and an accelerator electrode of the ion thruster for applying potential thereto, said high voltage supply receiving power from said unregulated DC buses and having a high voltage transformer primary therein, said primary being connected to said buses through a pulse width modulated switch so that the output voltages of both said high voltage secondaries are controlled.

2. A power-processing unit comprising:

a pair of alternating current buses for connection to supply alternating current power;

a plurality of power supply circuits each consisting of a serially connected inductor and a transformer primary connected between said buses, said circuits each also comprising a transformer secondary magnetically coupled to each said transformer primary, a rectifier connected to each said transformer secondary so that each of said secondaries can be connected to a load in an ion thruster for supplying a current limited direct current thereto;

at least one serially connected second inductor, second transformer primary and switch connected between said buses, a second transformer secondary magnetically coupled to said second transformer primary and second rectifiers connected to said second transfomer secondary to supply a current limited load, a temperature sensor connected to said switch to control said switch in accordance with sensed temperature of the load so that the load connectable to said second transformer secondary is current limited and powered in accordance with sensed temperature; and including a high voltage power supply having separate transformer secondaries for connection to a screen and an accelerator electrode of the ion thruster for applying potential thereto, said high voltage supply having a high voltage transformer primary therein, said primary being magnetically coupled to said secondaries and connected through a modulated switch so that the output voltages of both said high voltage secondaries are controlled.

3. A power-processing unit for providing the electric power requirements of an ion thruster, said power-processing unit comprising:

a pair of AC buses;

at least first and second current regulated power supplies, each of said first and second current regulated power supplies having a serial connection consisting of an inductor and a transformer primary connected to said buses, each said transformer primary having associated therewith a transformer secondary, and rectifiers connected to said transformer secondaries to provide current limited DC for connection to a main discharge and a main discharge keeper of the ion thruster;

at least first and second temperature controlled and current limited power supplies, each of said temperature regulated and current limited power supplies having a circuit consisting of an inductor, a transformer primary and a switch, control means connected to each said switch for controlling said switch in accordance with a desired temperature, a transformer secondary associated with each said transformer primary and rectifiers connected to each said transformer secondary so that said current regulated and temperature controlled power supplies are for connection to a discharge keeper heater and a discharge vaporizer heater of the ion thruster; and a high voltage supply for connection to screen and accelerator electrodes of the ion thruster, said high voltage power supply having a transformer and a switch for connecting said high voltage transformer to an electric source, said high voltage transformer having first and second secondaries for respective connection to screen and accelerator electrodes, rectifiers connected to the output of said high voltage transformer secondaries for rectifying the current to the electrodes, a sensor coil in said high voltage transformer to sense the magnetic field therein, said sensor coil being connected to control said switch to provide a substantially constant voltage at said first and second secondaries.

4. The power-processing unit of claim 3 wherein a temperature sensor is positioned adjacent the discharge vaporizer heater of the ion thruster, said temperature sensor being connected to control said switch in the primary circuit for providing current limited and temperature controlled power to the discharge vaporizer heater.

5. The power-processing unit of claim 4 wherein said temperature sensor is connected in bridge, and a coil is connected to sense the magnetic activity in said transformer in said temperature controlled power supply and is connected to said bridge to offset said bridge when normal current is sensed in said transformer.

6. The power-processing unit of claim 4 wherein a controller for controlling said switch is connected to the primary of said high voltage transformer, said controller being a pulse width modulated controller to control the output voltage for connection to the screen and accelerator electrodes.

7. The power-processing unit of claim 3 wherein a DC bus is connected to said switch in series with said high voltage transformer primary.

8. The power-processing unit of claim 7 wherein a controller for controlling said switch is connected to the primary of said high voltage transformer, said controller being a pulse width modulated controller to control the output voltage for connection to the screen and accelerator electrodes.

9. The power-processing unit of claim 3 further including a current limited power supply for connection to a neutralizer keeper on the ion thruster.

10. The power-processing unit of claim 9 further including a current limited and temperature controlled heater for connection to the neutralizer keeper heater of the ion thruster.

11. The power-processing unit of claim 10 further including a current limited and temperature controlled power supply for connection to the neutralizer vaporizer heater of the ion thruster.

* * * * *